United States Patent [19]

Kurtz

[11] 3,862,304

[45] Jan. 21, 1975

[54] SUTURES HAVING LONG-LASTING GERMICIDAL PROPERTIES

[75] Inventor: Leonard D. Kurtz, Woodmere, N.Y.

[73] Assignee: Sutures, Inc., Conventry, Conn.

[22] Filed: June 3, 1971

[21] Appl. No.: 149,826

[52] U.S. Cl. ................................................ 424/26
[51] Int. Cl. ............................................. A61k 9/00
[58] Field of Search ........ 424/26; 648/247; 851/739

[56] References Cited
UNITED STATES PATENTS

| | | | |
|---|---|---|---|
| 861,231 | 7/1907 | Clark | 424/26 X |
| 2,743,268 | 4/1956 | Stieff | 424/181 X |
| 2,751,910 | 6/1956 | Howes | 424/26 X |
| 2,830,011 | 4/1958 | Parker et al. | 424/181 |
| 2,932,591 | 4/1960 | Goodman | 117/201 |
| 3,069,320 | 12/1962 | Vitalis | 424/181 |
| 3,235,556 | 12/1966 | Wakeman et al. | 260/286 |
| 3,328,409 | 6/1967 | Wakeman et al. | 260/286 |
| 3,388,704 | 6/1968 | Kurtz | 128/335.5 |
| 3,642,003 | 2/1972 | Kurtz | 128/335.5 |
| 3,642,003 | 2/1972 | Kurtz | 424/26 X |

FOREIGN PATENTS OR APPLICATIONS 788,968  1/1958  Great Britain ...................... 424/329

Primary Examiner—Frederick E. Waddell
Attorney, Agent, or Firm—Larson, Taylor and Hinds

[57] ABSTRACT

Sutures of synthetic polymeric materials are treated to provide nucleophilic groups and subsequently sequentially treated with aqueous solutions of germicidal salts of ions of opposite charge, the ions being capable of reacting in aqueous solution to form a highly insoluble germicidal precipitate. A large quantity of germicidal material is thus incorporated into the suture to provide a long lasting reservoir of germicidal activity.

2 Claims, No Drawings

SUTURES HAVING LONG-LASTING GERMICIDAL PROPERTIES

BACKGROUND OF THE INVENTION

In my earlier application Ser. No. 648,247, filed June 23, 1967, now abandoned, and in my copending applications Ser. Nos. 851,739, filed Aug. 20, 1969 and 851,740, filed August 20, 1969, both now abandoned, I have disclosed methods of making sutures having long lasting germicidal properties. This is accomplished by sequentially treating a suture with aqueous solutions of germicidal salts to form a substantially insoluble germicidal precipitate in the suture. While the process provides sutures having these properties, particularly good results are obtained with certain sutures such as silk. With certain other sutures, such as those of polyethylene terephthalate, it is difficult to get a large amount of the insoluble precipitate into the suture. Accordingly, such sutures exhibit less germicidal efficacy than, for example, silk sutures similarly treated.

It is an object of the present invention to provide sutures having long lasting germicidal properties. It is a further object to provide such sutures with enhanced germicidal efficacy than was obtainable heretofore.

BRIEF SUMMARY OF THE INVENTION

The foregoing and other objects which will be apparent to one having ordinary skill in the art are achieved according to the present invention by a method which comprises the steps of providing a suture of a synthetic polymer material, treating the suture to provide said polymer with nucleophilic groups, contacting the treated suture with a first aqueous solution of a first germicidal salt including a germicidal ion, further contacting the suture with a second aqueous solution of a second germicidal salt including a germicidal ion having a charge opposite to that of the germicidal ion of said first germicidal salt, and said ions being capable of reacting in aqueous solution to form a highly insoluble germicidal precipitate.

DETAILED DESCRIPTION

There follows a detailed description of a preferred embodiment of the invention. However, it is to be understood that the detailed description is provided solely for the purpose of illustrating a preferred embodiment and that the invention is capable of numerous modifications and variations apparent to those skilled in the art without departing from the spirit and scope of the invention.

The sutures to which the invention relates are fabricated from synthetic polymers. These polymers are generally hydrophobic and are difficult to dye. While I do not wish to be bound to any theory, I believe that the same mechanism which renders hydrophobic synthetic polymers difficult to dye prevents the incorporation of a suitable amount of germicide in the suture. According to the present invention, prior to treatment with germicidal salts, I provide nucleophilic groups on the synthetic polymer. Nucleophilic groups are those which provide reactive sites for chemical reaction. These groups include carboxy groups, amino groups, and the like having an active hydrogen atom. Hydrophobic polymers which are difficult to dye include those which contain essentially no nucleophilic groups such as polyolefins and those such as acrylics and polyesters whose structure is so compact that their nucleophilic groups or bonding sites are not available. It is to these hydrophobic synthetic polymers which behave as if they were essentially free of nucleophilic groups to which the present invention relates.

According to the present invention, prior to incorporating germicidal materials into the suture, the suture is provided with nucleophilic groups. The manner in which these nucleophilic groups can be provided is well known in the art and any conventional technique can be employed such as flame treatment, electromagnetic radiation, electron bombardment, surface coatings, graft copolymerization, and the like. Each of these methods is known in the art and can be used to provide nucleophilic groups in synthetic polymer sutures according to the invention.

After the nucleophilic groups are provided, a long lasting germicide is provided in the suture by first contacting the suture with an aqueous solution of a germicidal salt including a germicidal ion, for example a polymixin B cation, and the suture is subsequently contacted with an aqueous solution of a germicidal salt including a germicidal ion having a charge opposite to that of the cation, for example an oxacillin B anion, the ions being capable of reacting in aqueous solution to form a highly insoluble germicidal polymixin-oxacillinate precipitate.

Several germicidal cations can be used including cationic antibiotics, germicidal metals such as silver, and the like. Suitable cationic antibiotics include those classified as polypeptides, sugars, and bases. Among the polypeptides may be mentioned bacitracin, polymixins, tyrothricin, viomycin and vancomycin. Sugars include neomycin, erythromycin, streptomycin, carbomycin, nystatin, kanamycin, and puromycin. Bases include cycloserine, tetracycline, aureomycin, terramycin, subtilin and amisomycin. Preferred cationic antibiotics include gentamycin and polymixin B.

The germicidal anion is preferably an antibiotic such as fumagillin, cephalothin and penicillins. The term "penicillins" as used herein means acid antibiotics which are structurally G-substituted penicillanic acids such as Penicillions G, N, O and V. nafcillin, methicillin, oxacillin, and the like. Cephalothin and oxacillin are preferred.

EXAMPLE I

A 3/0 Dacron suture provided with polyacrylic acid nucleophilic groups according to the technique described by Y. Shinohara et al., Journal of Polymer Science, Volume 44, page 195 (1960) "Graft Polymerization by a Preirradiation Method" is immersed in a 10% aqueous solution of gentamycin sulfate. After about 10 minutes, the treated suture is removed and excess liquid permitted to drain away. The suture is then immersed in a 10% aqueous solution of oxacillin sodium. After about 10 minutes, the suture is removed, drained, and dried at room temperature. The suture has sustained germicidal activity comparable to that of a silk suture similarly treated and better than that obtained with an identical Dacron suture not provided with nucleophilic groups.

EXAMPLE II

Example I is followed except that the anionic germicide is cephalothin sodium and the results are similar.

EXAMPLE III

Example I is followed except that the anionic germicide is silver nitrate. Results are similar.

EXAMPLE IV

Example I is followed except that the anionic germicide is penicillin G. Results are similar.

EXAMPLES V–VIII

Examples I–IV are followed except that, in each case, the cationic germicide is polymixin B sulfate. The results are similar.

EXAMPLES IX–XVI

Examples I–VIII are followed except that the nucleophilic polyacrylic acid copolymer groups are provided according to the process described in U.S. Pat. No. 2,932,591. Results are similar to those in Examples I–VIII.

EXAMPLES XVII–XXIV

Examples I–VIII are followed except that the process described in British Pat. No. 1,184,451 is followed. Results are similar.

As mentioned above, the nucleophilic sites can be provided in any conventional way such as flame treatment, electromagnetic radiation, electron bombardment, coatings, and the like. Where coatings are employed, conventional coatings such as polyamides, including nylon 66, can be employed. Virtually any technique for providing nucleophilic groups can be used and conventional materials and techniques can be employed for this purpose. Sutures of hydrophobic synthetic polymers so treated are easily provided with long-lasting germicides with results comparable to those achievable with silk. It is thus possible to obtain sutures having the beneficial characteristics of the synthetics plus the long-lasting germicidal efficacy heretofore obtainable only with non-synthetics such as silk.

What is claimed is:

1. In a method of providing a suture of a synthetic polymer selected from the group consisting of polyolefin, polyester and polyacrylic polymers with long-lasting bactericidal properties by contacting the suture with a first aqueous solution of a cationic antibiotic and further contacting the resulting suture with a second aqueous solution of an anionic antibiotic to form a highly insoluble germicidal salt on the said suture, the improvement which comprises providing the sulture with nucleophilic groups before said treatment.

2. The method of claim 1 wherein the cationic antibiotic is selected from the group consisting of polymixin and gentamycin and the acid antibiotic is selected from the group consisting of a penicillin and cephalothin.

* * * * *